US012725425B2

(12) United States Patent
Lee

(10) Patent No.: US 12,725,425 B2
(45) Date of Patent: Sep. 1, 2026

(54) APPARATUS FOR RECOGNIZING OBJECT AND METHOD THEREOF

(71) Applicants: Hyundai Motor Company, Seoul (KR); Kia Corporation, Seoul (KR)

(72) Inventor: En Sun Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 244 days.

(21) Appl. No.: 18/604,832

(22) Filed: Mar. 14, 2024

(65) Prior Publication Data

US 2025/0078523 A1 Mar. 6, 2025

(30) Foreign Application Priority Data

Aug. 31, 2023 (KR) ........................ 10-2023-0115834

(51) Int. Cl.
*G06V 20/58* (2022.01)
*G06T 7/73* (2017.01)
*G06V 20/56* (2022.01)

(52) U.S. Cl.
CPC ................ *G06V 20/58* (2022.01); *G06T 7/73* (2017.01); *G06V 20/588* (2022.01)

(58) Field of Classification Search
CPC .... G06V 20/58; G06V 20/588; G06V 10/764; G06V 10/82; G06V 20/56; G06V 10/25; G06V 10/26; G06T 7/73; G06T 7/70; G06T 2207/30256; G06T 17/20; G06T 2207/10028; G06T 2207/30252; B60W 40/02; B60W 2420/408; B60W 2554/20; B60W 2554/40; B60W 2420/403; B60W 2552/05; B60W 30/12; B60W 2552/10; B60W 2552/53; B60W 30/0956; B60W 40/04; B60W 40/06; B60W 2554/4029; G01S 17/931; G01S 13/867; G01S 13/931; G01S 2013/93271; G01S 2013/932; G01S 2013/9321; G08G 1/165; G08G 1/166
See application file for complete search history.

(56) References Cited

U.S. PATENT DOCUMENTS 11,630,199 B2 * 4/2023 Kim ........................ G01S 13/86
702/189
12,243,321 B2 * 3/2025 Derbisz .................. G06V 20/58
(Continued)

FOREIGN PATENT DOCUMENTS

KR 10-2023-0087198 A 6/2023
KR 10-2023-0117913 A 8/2023

*Primary Examiner* — Michael S Osinski
(74) *Attorney, Agent, or Firm* — Banner & Witcoff, Ltd.

(57) ABSTRACT

An object recognition apparatus includes a sensor, such as a LIDAR, and a processor. The processor may determine, based on at least one frame of data obtained via the sensor, at least one of a left road boundary or a right road boundary, of a road on which a vehicle (e.g., a host vehicle) is located, determine, on a plane formed based on at least two coordinate axes in a specific frame of the data, positions of contour points that represent an object, assign a first reliability value or a second reliability value to the object, the right road boundary, or the positions of the contour points, and determine, based on the first reliability value or the second reliability value, whether the object is a moving object, a movable stationary object, or an immovable stationary object.

20 Claims, 11 Drawing Sheets

(56) References Cited

U.S. PATENT DOCUMENTS

2007/0127777 A1* 6/2007 Fujimoto ............. G06V 20/588 382/104
2011/0044507 A1* 2/2011 Strauss ................. B60W 40/04 382/103
2015/0293216 A1* 10/2015 O'Dea .................. B60W 30/02 701/23
2015/0375752 A1* 12/2015 Carlsson .............. G06V 10/768 702/5
2016/0042645 A1* 2/2016 Harada ............. B60W 30/0956 701/117
2018/0188029 A1* 7/2018 Oka ................... G01C 19/5776
2018/0329418 A1* 11/2018 Baalke .................... G16Z 99/00
2019/0031197 A1* 1/2019 You ........................... B60R 1/24
2019/0250626 A1* 8/2019 Ghafarianzadeh ... G08G 1/0112
2020/0097740 A1* 3/2020 Hashimoto ............... G06T 7/70
2020/0209851 A1* 7/2020 Iwamoto .............. G05D 1/0088
2021/0237771 A1* 8/2021 Cai ...................... G05D 1/0214
2021/0248391 A1* 8/2021 Kizumi .............. G01C 21/3863
2021/0287019 A1* 9/2021 Wang .................... G01S 13/931
2022/0092321 A1* 3/2022 Keiser ...................... G06N 3/08
2022/0189040 A1* 6/2022 Baeg ....................... G06T 7/251
2022/0348207 A1* 11/2022 Kim .................... B60W 30/143
2022/0383146 A1* 12/2022 Schoeler ................ G06N 5/022
2023/0050013 A1* 2/2023 Sung ....................... G01S 17/89
2023/0115240 A1* 4/2023 Sidhu ................ B60W 60/0053 701/25
2023/0186648 A1 6/2023 Ra et al.
2023/0243970 A1 8/2023 Lee et al.
2023/0316781 A1* 10/2023 Yasui .................. G06V 20/588 382/104
2024/0062505 A1* 2/2024 Mishima ................ G08G 1/165
2024/0087136 A1* 3/2024 Waez ................ B60W 60/0027
2024/0409125 A1* 12/2024 Taylor ................... B60W 30/12
2025/0002041 A1* 1/2025 Lorenzetti .......... B60W 60/0011
2025/0010854 A1* 1/2025 Cheng .................. G06V 10/764
2025/0078927 A1* 3/2025 Yu ...................... G11C 16/0483
2025/0216865 A1* 7/2025 Matsunaga .......... G06V 10/764

* cited by examiner

201

| | CHARACTERISTICS | | WEIGHT | Σ CHARACTERISTICS * WEIGHT = SCORE |
|---|---|---|---|---|
| Static Object | OUT-LANE INFORMATION | 211 | $WEIGHT_{S1}$ | IMMOBILITY SCORE 203 |
| | BOX SIZE INFORMATION | 213 | $WEIGHT_{S2}$ | |
| | BOX MATCHING INFORMATION | 215 | $WEIGHT_{S3}$ | |
| | ... | | | |
| Dynamic Object | IN-LANE INFORMATION | 217 | $WEIGHT_{D1}$ | MOBILITY SCORE 205 |
| | TRACKING INFORMATION | 219 | $WEIGHT_{D2}$ | |
| | OTHER IN-LANE-OBJECT INFORMATION | 221 | $WEIGHT_{D3}$ | |
| | SPEED INFORMATION | 223 | $WEIGHT_{D4}$ | |
| | CONTOUR POINT DISTRIBUTION INFORMATION | 225 | $WEIGHT_{D5}$ | |
| | BOUNDARY OBJECT INFORMATION | 227 | $WEIGHT_{D6}$ | |
| | ... | | | |

FIG 2

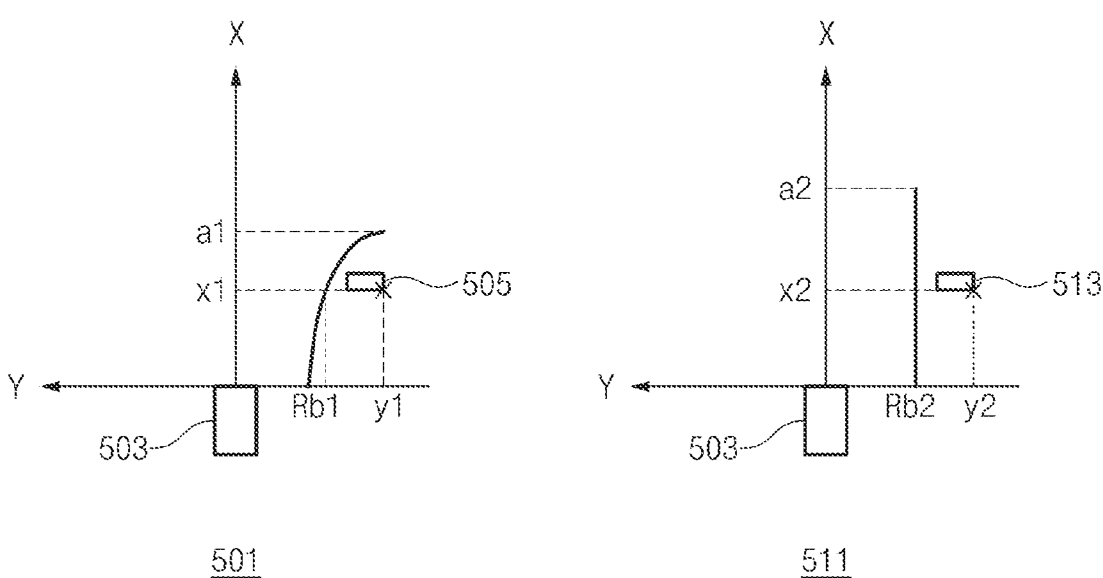
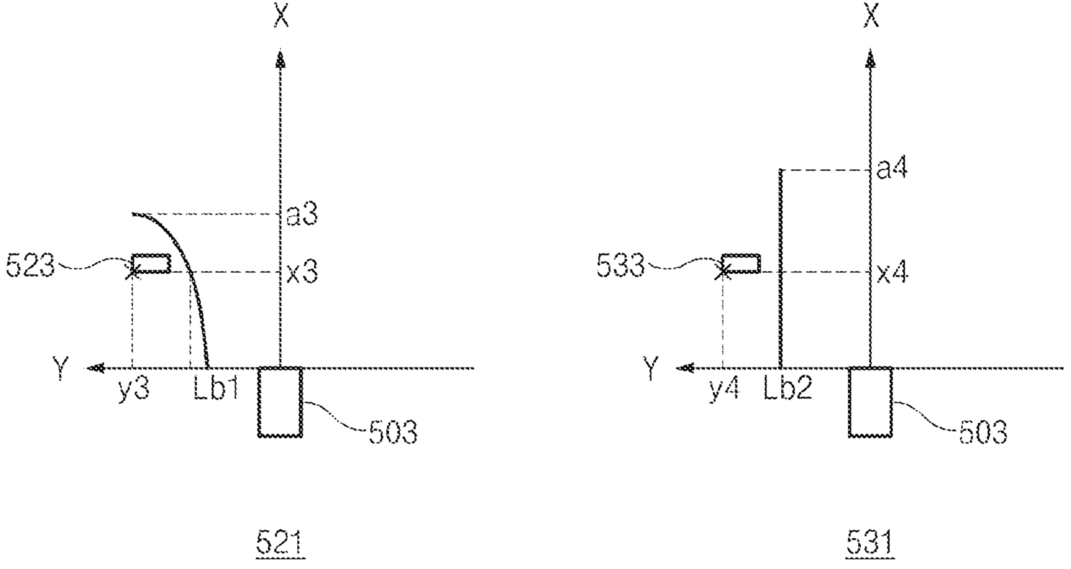
FIG.5

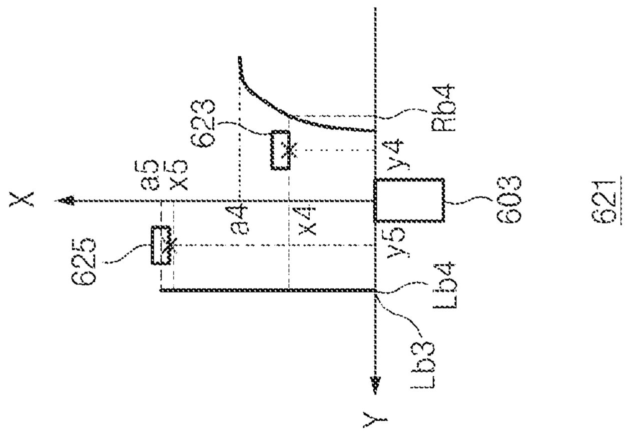
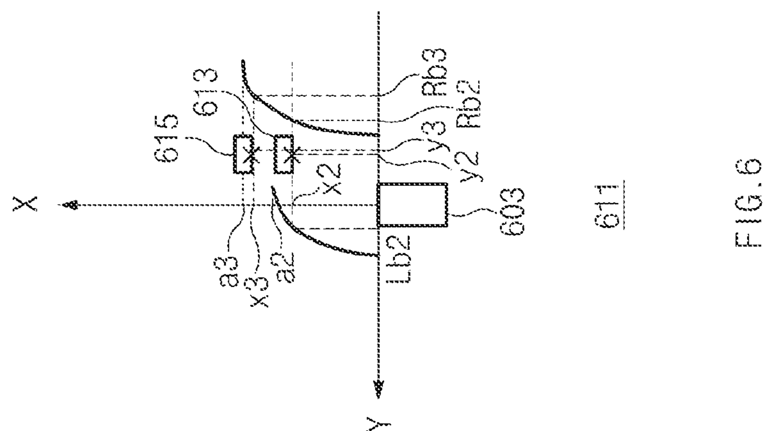
FIG. 6
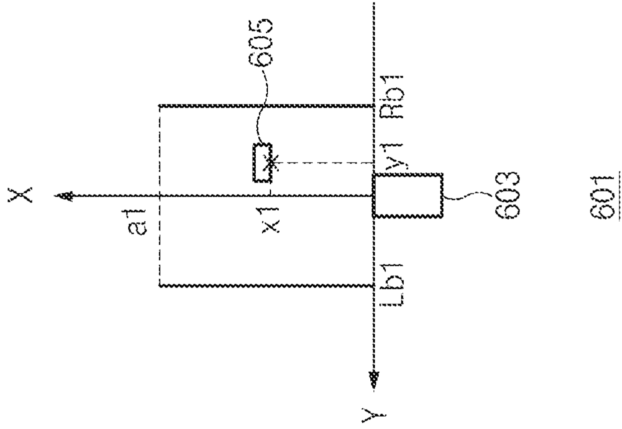

APPARATUS FOR RECOGNIZING OBJECT AND METHOD THEREOF

CROSS-REFERENCE TO RELATED APPLICATION

This application claims the benefit of priority to Korean Patent Application No. 10-2023-0115834, filed in the Korean Intellectual Property Office on Aug. 31, 2023, the entire contents of which are incorporated herein by reference.

TECHNICAL FIELD

The present disclosure relates to an object recognition apparatus and method, and more particularly, to a technique for identifying characteristics of an object based on a contour point obtained through a light detection and ranging (LIDAR) device.

BACKGROUND

A vehicle may obtain data indicating the location of an object around the vehicle through a LIDAR in order for the vehicle to perform autonomous driving or driver assistance driving. A distance from a LIDAR to an object can be obtained by measuring an interval between the time when laser is transmitted by the LIDAR and the time when the laser reflected by the object is received. A vehicle is able to identify the position of a point (e.g., a data point) belonging to the surface of an object around an area where the vehicle is located, based on the angle of the transmitted laser and the distance to the object.

An autonomous vehicle or a vehicle with an activated driver assistance device may identify information on an object represented by points based on position information and distribution information of the obtained points. In particular, technology to identify whether an object is a moving object, an object capable of being in a moving state, or an object incapable of being in a moving state may be important to ensure the stability of autonomous driving or driver assistance driving and reduce the risk of accidents.

SUMMARY

The present disclosure has been made to solve the above-mentioned problems occurring in some implementations while advantages achieved by those implementations are maintained intact.

An aspect of the present disclosure provides an object recognition apparatus and method for identifying whether an object is a moving object or an object capable of being in a moving state.

An aspect of the present disclosure provides an object recognition device and method for identifying whether an object having a part obscured or being in a stationary state is an object is a moving object or an object capable of being in a moving state.

An aspect of the present disclosure provides an object recognition device and method for identifying whether an object, which is not located on a lane where another object which is a moving object or an object capable of being in a moving state, is an object is a moving object or an object capable of being in a moving state.

An aspect of the present disclosure provides an object recognition device and method for improving the accuracy of determination of identifying whether an object is a moving object or an object capable of being in a moving state.

The technical problems of the present disclosure are not limited to the aforementioned problems, and any other technical problems not mentioned herein will be clearly understood from the following description by those skilled in the art.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, an object recognition apparatus may include: a sensor; and a processor. The processor may be configured to determine, based on at least one frame of data obtained via the sensor, at least one of a left road boundary or a right road boundary, of a road on which a vehicle is located; determine, on a plane formed based on at least two coordinate axes in a specific frame of the data, positions of contour points that represent an object; assign a first reliability value or a second reliability value to the object based on at least one of the left road boundary, the right road boundary, or the positions of the contour points; and determine, based on the first reliability value or the second reliability value, whether the object is a moving object, a movable stationary object, or an immovable stationary object. The first reliability value may indicate that the object is the immovable stationary object. The second reliability value may indicate that the object is the moving object or the movable stationary object.

The processor may be configured to assign the first reliability value or the second reliability value to the object by: determining, based on the contour points and based on the positions of the contour points being on a right side of the vehicle, a first object box; determining a first y-axis coordinate value and a first x-axis coordinate value of a rightmost point of the contour points included in the first object box; determining a second y-axis coordinate value of a first point that is located on the right road boundary and corresponds to the first x-axis coordinate value; assigning the first reliability value to the object, based on the first y-axis coordinate value and the second y-axis coordinate value indicating that the rightmost point is to right of the first point; determining, based on second contour points and based on positions of the second contour points being on a left side of the vehicle, a second object box; determining a third y-axis coordinate value and a second x-axis coordinate value of a leftmost point of the second contour points included in the second object box; determining a fourth y-axis coordinate value of a second point that is located on the left road boundary and corresponds to the second x-axis coordinate value; and assigning the first reliability value to the object based on the third y-axis coordinate value and the fourth y-axis coordinate value indicating that the leftmost point is to left of the second point.

The processor may be configured to assign the first reliability value or the second reliability value to the object by: determining an object box including the contour points; determining a first y-axis coordinate value and a first x-axis coordinate value of a center point of a line segment, closest to the vehicle, of the object box; and assigning the second reliability value to the object based on: the first x-axis coordinate value being located within a specified range, the first y-axis coordinate value being to right of a second y-axis coordinate value of a point that is located on the left road boundary and corresponds to the first x-axis coordinate value, and the first y-axis coordinate value being to left of a third y-axis coordinate value of a point that is located on the right road boundary and corresponds to the first x-axis coordinate value.

The processor may be further configured to: determine, as a reference value, a greater of: a first x-axis coordinate value of a first point having a greatest absolute x-axis coordinate value of the left road boundary, and a second x-axis coordinate value of a second point having a greatest absolute x-axis coordinate value of the right road boundary; and determine whether the object is located in a specified range. The specified range may include points having an x-axis coordinate value between a third x-axis coordinate value of a third point corresponding to the vehicle and the reference value.

The processor may be configured to assign the first reliability value or the second reliability value to the object by: determining, as a first reference value, a lesser of: a first x-axis coordinate value of a first point having a greatest absolute x-axis coordinate value of the left road boundary, and a second x-axis coordinate value of a second point having a greatest absolute x-axis coordinate value of the right road boundary; determining, as a second reference value, a greater of the first x-axis coordinate value and the second x-axis coordinate value; assigning a first value to the object as the second reliability value, based on a determination that a third x-axis coordinate value of a third point corresponding to the object is between: a fourth x-axis coordinate value of a fourth point corresponding to the vehicle, and the first reference value; determining, as a third reference value, a lesser of: a fifth x-axis coordinate value of a fifth point having a greatest absolute x-axis coordinate value of a second left road boundary, and a sixth x-axis coordinate value of a sixth point having a greatest absolute x-axis coordinate value of a second right road boundary; determining, as a fourth reference value, a greater of the fifth x-axis coordinate value and the sixth x-axis coordinate value; and assigning a second value less than the first value to the object as the second reliability value, based on a determination that a seventh x-axis coordinate value of a seventh point corresponding to a second object is between the third reference value and the fourth reference value.

The processor may be configured to assign the first reliability value or the second reliability value to the object by performing one of: assigning, based on the left road boundary being determined and the right road boundary being not determined, the second reliability value to the object, based on a determination that a center point of a closest line segment, to the vehicle, of an object box, which includes the contour points, is: to left of a first point corresponding to the vehicle, and to right of a second point located on the left road boundary, according to: a first y-axis coordinate value of a third point that is located on the left road boundary and corresponds to a first x-axis coordinate value of the center point, and a second y-axis coordinate value of the center point; or assigning, based on the right road boundary being determined and the left road boundary being not determined, the second reliability value to the object, based on a determination that the center point is: to right of a fourth point corresponding to the vehicle, and to left of a fifth point located on the right road boundary, according to: a third y-axis coordinate value of a sixth point that is located on the right road boundary and corresponds to the first x-axis coordinate value, and the second y-axis coordinate value.

The second reliability value assigned to the object may be less when only one of the left road boundary or the right road boundary is determined than when both the left road boundary and the right road boundary are determined.

The processor may be configured to assign the first reliability value or the second reliability value to the object by: determining whether the second reliability value is assigned to a second object to which the first reliability value has not been assigned.

The processor may be configured not to assign the first reliability value or the second reliability value to: a second object on a right side of the vehicle based on the right road boundary being not determined and the left road boundary being determined, and a third object on a left side of the vehicle based on the left road boundary being not determined and the right road boundary being determined.

The moving object or the movable stationary object may include a vehicle different from the vehicle. The processor may be configured to assign, to the object, an identifier indicating that the object is the moving object or the movable stationary object.

According to one or more example embodiments of the present disclosure, an object recognition method, performed by a computing device, may include: determining, based on at least one frame of data obtained via a sensor, at least one of a left road boundary or a right road boundary, of a road on which vehicle is located; determining, on a plane formed based on at least two coordinate axes in a specific frame of the data, positions of contour points that represent an object; assigning a first reliability value or a second reliability value to the object based on at least one of the left road boundary, the right road boundary, or the positions of the contour points; and determining, based on the first reliability value or the second reliability value, whether the object is a moving object, a movable stationary object, or an immovable stationary object. The first reliability value may indicate that the object is the immovable stationary object. The second reliability value may indicate that the object is the moving object or the movable stationary object.

Assigning the first reliability value or the second reliability value to the object may include: determining, based on the contour points and based on the positions of the contour points being on a right side of the vehicle, a first object box; determining a first y-axis coordinate value and a first x-axis coordinate value of a rightmost point of the contour points included in the first object box; determining a second y-axis coordinate value of a first point that is located on the right road boundary and corresponds to the first x-axis coordinate value; assigning the first reliability value to the object, based on the first y-axis coordinate value and the second y-axis coordinate value indicating that the rightmost point is to right of the first point; determining, based on second contour points and based on positions of the second contour points being on a left side of the vehicle, a second object box; determining a third y-axis coordinate value and a second x-axis coordinate value of a leftmost point of the second contour points included in the second object box; determining a fourth y-axis coordinate value of a second point that is located on the left road boundary and corresponds to the second x-axis coordinate value; and assigning the first reliability value to the object based on the third y-axis coordinate value and the fourth y-axis coordinate value indicating that the leftmost point is to left of the second point.

Assigning the first reliability value or the second reliability value to the object may include: determining an object box including the contour points; determining a first y-axis coordinate value and a first x-axis coordinate value of a center point of a line segment, closest to the vehicle, of the object box; and assigning the second reliability value to the object based on: the first x-axis coordinate value being located within a specified range, the first y-axis coordinate value being to right of a second y-axis coordinate value of a point that is located on the left road boundary and corresponds to the first x-axis coordinate value, and the first y-axis coordinate value being to left of a third y-axis coordinate value of a point that is located on the right road boundary and corresponds to the first x-axis coordinate value.

The object recognition method may further include: determining, as a reference value, a greater of: a first x-axis coordinate value of a first point having a greatest absolute x-axis coordinate value of the left road boundary, and a second x-axis coordinate value of a second point having a greatest absolute x-axis coordinate value of the right road boundary; and determining whether the object is located in a specified range. The specified range may include points having an x-axis coordinate value between a third x-axis coordinate value of a third point corresponding to the vehicle and the reference value.

Assigning the first reliability value or the second reliability value to the object may include: determining, as a first reference value, a lesser of: a first x-axis coordinate value of a first point having a greatest absolute x-axis coordinate value of the left road boundary and a second x-axis coordinate value of a second point having a greatest absolute x-axis coordinate value of the right road boundary; determining, as a second reference value, a greater of the first x-axis coordinate value and the second x-axis coordinate value; assigning a first value to the object as the second reliability value based on a determination that a third x-axis coordinate value of a third point corresponding to the object is between: a fourth x-axis coordinate value of a fourth point corresponding to the vehicle, and the first reference value; determining, as a third reference value, a lesser of: a fifth x-axis coordinate value of a fifth point having a greatest absolute x-axis coordinate value of a second left road boundary, and a sixth x-axis coordinate value of a sixth point having a greatest absolute x-axis coordinate value of a second right road boundary; determining, as a fourth reference value, a greater of the fifth x-axis coordinate value and the sixth x-axis coordinate value; and assigning a second value less than the first value to the object as the second reliability value, based on a determination that a seventh x-axis coordinate value of a seventh point corresponding to a second object is between the third reference value and the fourth reference value.

Assigning the first reliability value or the second reliability value to the object may include: Assigning, based on the left road boundary being determined and the right road boundary being not determined, the second reliability value to the object, based on a determination that a center point of a closest line segment, to the vehicle, of an object box, which includes the contour points, is: to left of a first point corresponding to the vehicle, and to right of a second point located on the left road boundary, according to: a first y-axis coordinate value of a third point that is located on the left road boundary and corresponds to a first x-axis coordinate value of the center point, and a second y-axis coordinate value of the center point; or assigning, based on the right road boundary being determined and the left road boundary being not determined, the second reliability value to the object, based on a determination that the center point is: to right of a fourth point corresponding to the vehicle, and to left of a fifth point located on the right road boundary, according to: a third y-axis coordinate value of a sixth point that is located on the right road boundary and corresponds to the first x-axis coordinate value, and the second y-axis coordinate value.

The second reliability value assigned to the object may be less when only one of the left road boundary or the right road boundary is determined than when both the left road boundary and the right road boundary are determined.

Assigning of the first reliability value or the second reliability value to the object may include: determining whether the second reliability value is assigned to a second object to which the first reliability value has not been assigned.

The object recognition method may further include: not assigning the first reliability value or the second reliability value to: a second object on a right side of the vehicle based on the right road boundary being not determined and the left road boundary being determined, and a third object on a left side of the vehicle based on the left road boundary being not determined and the right road boundary being determined.

The moving object or the movable stationary object may include a vehicle different from the vehicle. The method may further include: assigning, to the object, an identifier indicating that the object is the moving object or the movable stationary object.

BRIEF DESCRIPTION OF THE DRAWINGS

The above and other objects, features and advantages of the present disclosure will be more apparent from the following detailed description taken in conjunction with the accompanying drawings:

FIG. 2 is a table showing information required to classify objects in an object recognition apparatus or an object recognition method;

FIG. 5 shows an example of an object located outside a road in an object recognition apparatus or an object recognition method;

FIG. 6 shows an example of an object located inside a road in an object recognition device or an object recognition method;

DETAILED DESCRIPTION

Figure 1:
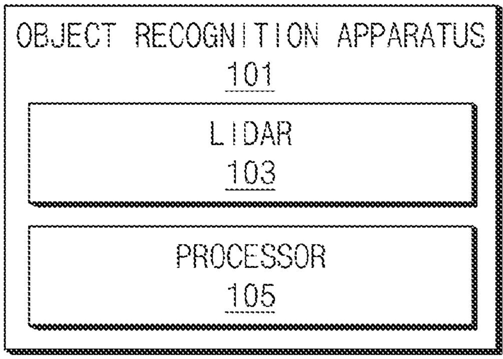
FIG. 1 is a block diagram showing an object recognition apparatus.

Hereinafter, one or more example embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the example embodiment of the present disclosure, a detailed description of well-known features or functions will be ruled out in order not to unnecessarily obscure the gist of the present disclosure.

In describing the components of the one or more example embodiments of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Further, the terms "unit", "device", "member", "body", or the like used hereinafter may indicate at least one shape structure or may indicate a unit for processing a function.

In addition, the expressions "greater than" or "less than" may be used to indicate whether a specific condition is satisfied or fulfilled, but are used only to indicate examples, and do not exclude "greater than or equal to" or "less than or equal to". A condition indicating "greater than or equal to" may be replaced with "greater than", a condition indicating "less than or equal to" may be replaced with "less than", a condition indicating "greater than or equal to and less than" may be replaced with "greater than and less than or equal to". In addition, 'A' to 'B' means at least one of elements from A (including A) to B (including B).

Hereinafter, one or more example embodiments of the present disclosure will be described in detail with reference to FIGS. 1 to 11.

FIG. 1 is a block diagram showing an object recognition apparatus.

Referring to FIG. 1, an object recognition apparatus 101 may be implemented inside a vehicle. In this case, the object recognition apparatus 101 may be integrally formed with internal control units of the vehicle, or may be implemented as a separate device and connected to the control units of the vehicle by separate connection means.

Referring to FIG. 1, the object recognition apparatus 101 may include a sensor, such as a LIDAR 103, and a processor 105.

The processor 105 of the object recognition apparatus 101 may obtain location information of points of an object around a vehicle including the object recognition apparatus 101 through the LIDAR 103. The processor 105 of the object recognition apparatus 101 may acquire a point cloud representing the object through the LIDAR 103. The processor 105 of the object recognition apparatus 101 may identify contour points among points included in the point cloud.

The processor 105 of the object recognition apparatus 101 may identify position information of a point corresponding to an object based on contour points representing the object. For example, the point corresponding to the object may include a center point of the rearmost line segment in the moving direction of the object among line segments constituting an object box including contour points representing the object. The center point may be referred to as a tracking point, but may not be limited thereto. For example, the point corresponding to the object may include, but is not limited to, the rightmost point among the contour points included in the object box. For example, the point corresponding to the object may include, but is not limited to, the leftmost point among the contour points included in the object box.

The processor 105 of the object recognition apparatus 101 may calculate a score value indicating a probability that an object is an object incapable of being in a moving state (e.g., an immovable stationary object such as a road sign), based on a first reliability value, which is a reliability value according to out-lane information of the object. The processor 105 of the object recognition apparatus 101 may calculate a score value indicating a probability that an object is a moving object (e.g. a moving vehicle) or an object capable of being in a moving state (e.g. a movable stationary object such as a stationary vehicle), based on a second reliability value, which is a reliability value according to in-lane information of the object. Identifying the score value indicating the probability that an object is a moving object or an object capable of being in a moving state, based on the first reliability value according to the out-lane information or the score value indicating the probability that an object is an object incapable of being in a moving state (e.g., an immovable stationary object), based on the second reliability value according to the in-lane information will be described below with reference to FIG. 2.

The processor 105 of the object recognition apparatus 101 may identify that an object is a moving object or an object capable of being in a moving state, based on the score value indicating the probability that an object is a moving object or an object capable of being in a moving state being greater than the score value indicating the probability that an object is an object incapable of being in a moving state.

The processor 105 of the object recognition apparatus 101 may assign, to the object, an identifier indicating that the object is a moving object or an object capable of being in a moving state based on identifying that the object is a moving object or an object capable of being in a moving state. The processor 105 of the object recognition apparatus 101 may assign, to the object, an identifier indicating that the object is an object incapable of being in a moving state, based on identifying that the object is an object capable of being in a moving state. The identifier may be referred to as a flag, but may not be limited thereto.

FIG. 2 is a table showing information required to classify objects in an object recognition apparatus or an object recognition method.

Referring to FIG. 2, table 201 may represent types of information for calculating a score for identifying whether an object is a moving object or an object capable of being in a moving state. An immobility score 203 may represent a score for identifying whether an object is an object incapable of being in a moving state. The immobility score 203 may be identified based on information such as out-lane information 211, box size information 213, and box matching information 215. A mobility score 205 may represent a score for identifying whether an object is a moving object or an object capable of being in a moving state. The mobility score 205 may be identified based on information such as in-lane information 217, tracking information 219, other in-lane-object information 221, speed information 223, contour point distribution information 225, and boundary object information 227.

The out-lane information 211 for identifying the immobility score 203 may represent a first reliability assigned based on whether an object is identified outside a lane. The box size information 213 for identifying the immobility score 203 may represent a first reliability assigned based on whether the size of an object box is greater than or equal to a reference size. The box matching information 215 for identifying the immobility score 203 may represent a first reliability assigned based on the distribution of contour points and the degree of matching of the object box.

The in-lane information 217 may represent a second reliability assigned based on whether an object is identified inside a lane. The tracking information 219 may represent a second reliability assigned based on whether an object is moving. The speed information 223 may represent a second reliability assigned based on the speed of an object. The boundary object information 227 may represent a second reliability assigned based on whether an object is identified without being not obscured at the boundary of the field of view.

The immobility score 203 may be identified by the sum of values obtained by multiplying the first reliabilities represented by pieces of information by a weight. For example, the immobility score 203 may be identified by the sum of at least one of a value obtained by multiplying the first reliability according to the out-lane information 211 by a weight (e.g., weights) corresponding to the out-lane information 211, a value obtained by multiplying the first reliability according to the box size information 213 by a weight (e.g., $weight_{S2}$) corresponding to the box size information 213, or a value obtained by multiplying the first reliability according to the box matching information 215 by a weight (e.g., $weight_{S3}$) corresponding to the box matching information 215, or any combination thereof. However, example embodiments of the present disclosure may not be limited thereto. The immobility score 203 may be identified by adding up not only a value obtained by multiplying information listed in the table 201 by a weight, but also a value obtained by multiplying information not listed in the table 201 by the weight.

The mobility score 205 may be identified by the sum of values obtained by multiplying the second reliabilities represented by pieces of information by a weight. For example, the mobility score 205 may be identified by the sum of at least one of a value obtained by multiplying the second reliability according to the in-lane information 217 by a weight (e.g., $weigh_{D1}$) corresponding to the in-lane information 217, a value obtained by multiplying the second reliability according to the tracking information 219 by a weight (e.g., $weight_{D2}$) corresponding to the tracking information 219, a value obtained by multiplying the second reliability according to the other in-lane-object information 221 by a weight (e.g., $weight_{D3}$) corresponding to the other in-lane-object information 221, a value obtained by multiplying the second reliability according to the speed information 223 by a weight (e.g., $weight_{D4}$) corresponding to the speed information 223, a value obtained by multiplying the second reliability according to the contour point distribution information 225 by a weight (e.g., $weight_{D5}$) corresponding to the contour point distribution information 225, or a value obtained by multiplying the second reliability according to the boundary object information 227 by a weight (e.g., $weight_{D6}$) corresponding to the boundary object information 227, or any combination thereof. However, example embodiments of the present disclosure may not be limited thereto. The mobility score 205 may be identified by adding up not only a value obtained by multiplying information listed in the table 201 by a weight, but also a value obtained by multiplying information not listed in the table 201 by the weight.

If the mobility score 205 for a certain object is higher than the immobility score 203 for the certain object, the processor of the object recognition apparatus may identify that the certain object is a moving object or an object capable of being in a moving state. If the immobility score 203 for a certain object is higher than the mobility score 205 for the certain object, the processor of the object recognition apparatus may identify that the certain object is an object incapable of being in a moving state.

The processor of the object recognition apparatus may identify the first reliability indicated by the out-lane information 211 and the second reliability indicated by the in-lane information 217. A method for identifying the first reliability indicated by the out-lane information 211 and the second reliability indicated by the in-lane information 217 will be described with reference to FIGS. 4 to 8 below.

Figure 3:
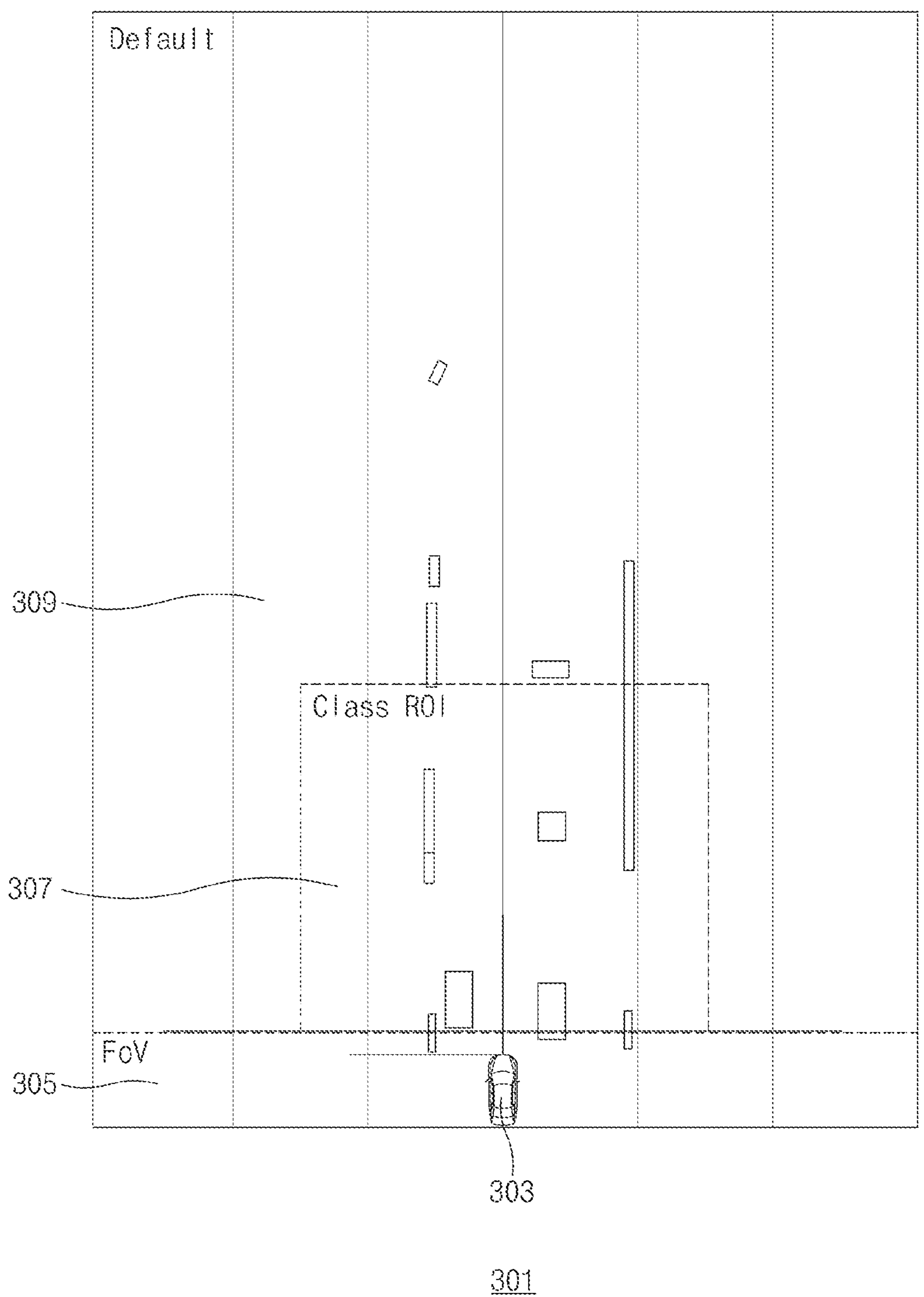
FIG. 3 shows an area in which the weight of reliability values varies according to information related to an object recognition apparatus or an object recognition method.

FIG. 3 shows an area in which the weight of reliability values varies according to information related to an object recognition apparatus or an object recognition method.

Referring to FIG. 3, a frame 301 may represent a first region 305, a second region 307, and a third region 309 separated according to a distance from a host vehicle 303 including the object recognition apparatus. The first region 305 may include an area within a field of view. The second region 307 may include an area for classifying objects of interest. The third region 309 may include areas other than the first area and the second area. The first region 305 may be referred to as a field of view (FOV) area, but may not be limited thereto. The second region 307 may be referred to as a class region of interest (class ROI), but may not be limited thereto. The third area may be referred to as a default region, but may not be limited thereto.

The processor of the object recognition apparatus may assign different weights (e.g., weights in FIG. 2) for identifying an immobility score or a mobility score according to a region in which an object is included. This is because information of high importance may vary depending on the position of an object. For example, the processor of the object recognition apparatus may set a weight of the contour point distribution information 225 to a value greater than 0 only in the second region 307. For example, the processor of the object recognition apparatus may set the weight of the boundary object information 227 in the first region 305 higher than the weight of the boundary object information 227 in the second region 307 and the weight of the boundary object information 227 in the third region 309.

Figure 4:
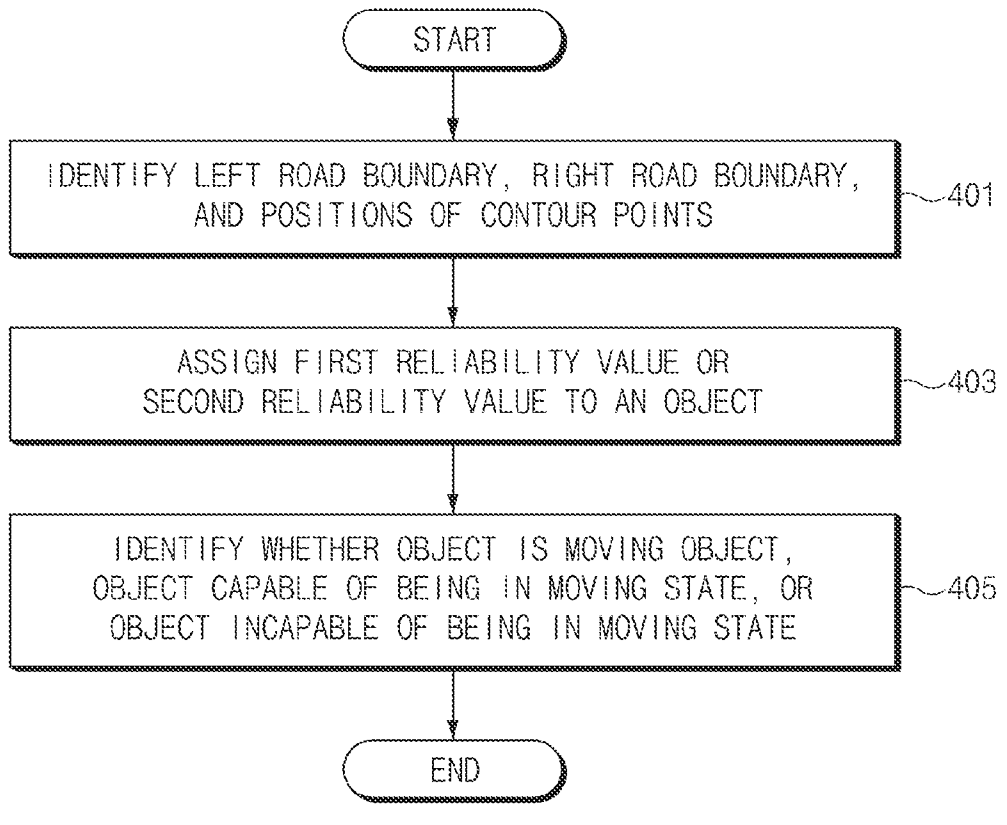
FIG. 4 shows a flowchart of operation of an object recognition apparatus for assigning a reliability value and classifying objects according to the reliability value in the object recognition apparatus or an object recognition method.

FIG. 4 shows a flowchart of operation of an object recognition apparatus for assigning a reliability value and classifying objects according to the reliability value in the object recognition apparatus or an object recognition method.

Hereinafter, it is assumed that the object recognition apparatus 101 of FIG. 1 performs the process of FIG. 4. Additionally, in the description of FIG. 4, operations described as being performed by the apparatus may be understood as being controlled by the processor 105 of the object recognition apparatus 101.

Referring to FIG. 4, in a first operation 401, the processor of the object recognition apparatus may identify a road boundary on the left, a road boundary on the right, and positions of contour points.

The road boundary on the left may refer to a road boundary located on the left side of a host vehicle including the object recognition apparatus. The road boundary on the right may refer to a road boundary located on the right side of the host vehicle. The contour points may represent an object. The contour points representing the object may be included in an object box corresponding to the object.

The processor of the object recognition apparatus may identify the positions of contour points that are identified in a plane formed by x-axis and y-axis among the x-axis, y-axis, and z-axis in a certain frame and represent the object.

In a second operation 403, the processor of the object recognition apparatus may assign a first reliability value or a second reliability value to an object. In other words, the processor of the object recognition apparatus may assign a first reliability value or a second reliability value to the object based on at least one of the left road boundary, the right road boundary, or the positions of contour points, or any combination thereof.

The processor of the object recognition apparatus may assign a reliability value depending on whether the object is inside a road or outside the road.

For example, the processor of the object recognition apparatus may assign a first reliability value to the object, the first reliability value being a reliability value indicating that the object is an object incapable of being in a moving state, based on identifying that the object is outside a road.

For example, the processor of the object recognition apparatus may assign a second reliability value to the object, the second reliability value being a reliability value indicating that the object is a moving object or an object capable of being in a moving state, based on identifying that the object is inside a road.

The processor of the object recognition apparatus may not identify whether an object identified as being included on the outside of the road is included on the inside of the road. Accordingly, the processor of the object recognition apparatus may not assign a second reliability value to an object to which a first reliability value has been assigned. The processor of the object recognition apparatus may identify whether a second reliability value is assigned to an object that has not been assigned a first reliability value.

An operation for identifying whether an object is included on the outside of the road will be described below with reference to FIG. 5. An operation for identifying whether an object is included on the inside a road will be described below with reference to FIGS. 6 and 7.

In a third operation 405, the processor of the object recognition apparatus may identify whether an object is a moving object, an object capable of being in a moving state, or an object incapable of being in a moving state.

As described above, the processor of the object recognition apparatus may identify whether an object is a moving object, an object capable of being in a moving state, or an object incapable of being in a moving state by comparing an immobility score value according to the first reliability and a mobility score value according to the second reliability.

For example, when the mobility score according to the second reliability value for a certain object is higher than the immobility score according to the first reliability value for the certain object, the processor of the object recognition apparatus may identify that the certain object is a moving object or an object capable of being in a moving state. If the immobility score according to the first reliability value for a certain object is higher than the mobility score according to the second reliability value for the certain object, the processor of the object recognition apparatus may identify that the certain object is an object incapable of being in a moving state.

The processor of the object recognition apparatus may assign, to the object, an identifier indicating that the object is a moving object or an object that is able to be in a moving state based on identifying that the object is a moving object or an object that is able to be in a moving state. The processor of the object recognition apparatus may assign, to the object, an identifier indicating that the object is an object that is not able to be in a moving state, based on identifying that the object is an object that is not able to be in a moving state. The identifier may be referred to as a flag, but may not be limited thereto.

FIG. 5 shows an example of an object located outside a road in an object recognition apparatus or an object recognition method.

Referring to FIG. 5, in a first situation 501, the processor of the object recognition apparatus may identify that a first object 505 is located outside a road based on identifying the first object 505 located on the right side of a right road boundary. In the first situation 501, the degree of curvature of the right road boundary may be greater than or equal to a reference curvature.

In a second situation 511, the processor of the object recognition apparatus may identify that a second object 513 is located outside a road based on identifying the second object 513 located on the right side of a right road boundary. In the second situation 511, the degree of curvature of the right road boundary may be less than the reference curvature.

In a third situation 521, the processor of the object recognition apparatus may identify that a third object 523 is located outside a road based on identifying the third object 523 located on the left side of a left road boundary. In the third situation 521, the degree of curvature of the left road boundary may be greater than or equal to the reference curvature.

In a fourth situation 541, the processor of the object recognition apparatus may identify that a fourth object 533 is located outside a road based on identifying the fourth object 533 located on the left side of a left road boundary. In the fourth situation 541, the degree of curvature of the left road boundary may be less than the reference curvature.

In the first situation 501 and the second situation 511, the right road boundary may be identified on the right side of a host vehicle 503 including the object recognition apparatus.

In the first situation 501 and the second situation 511, when the positions of contour points representing an object (e.g., the first object 505 or the second object 513) are located on the right side of the host vehicle 503, the processor of the object recognition apparatus may identify a first y-axis coordinate value (e.g., y1 in the first situation 501, or y2 in the second situation 511) and a first x-axis coordinate value (e.g., x1 of the first situation 501 or x2 of the second situation 511) of the rightmost point among the contour points included in the object box representing the object. The processor of the object recognition apparatus may identify a second y-axis coordinate value (e.g., Rb1 in the first situation 501 or Rb2 in the second situation 511) of a point located on the right road boundary corresponding to the first x-axis coordinate value.

The processor of the object recognition apparatus may assign a first reliability value to the object based on identifying that the first y-axis coordinate value of the rightmost point is to the right of the second y-axis coordinate value.

In the third situation 521 and the fourth situation 531, the left road boundary may be identified on the left side of the host vehicle 503 including the object recognition apparatus.

In the third situation 521 and the fourth situation 531, when the positions of contour points representing an object (e.g., the third object 523 or the fourth object 533) are located on the left side of the host vehicle 503, the processor of the object recognition apparatus may identify a first y-axis coordinate value (e.g., y3 in the third situation 521, or y4 in the fourth situation 531) and a first x-axis coordinate value (e.g., x3 of the third situation 521 or x4 of the fourth situation 531) of the leftmost point among the contour points included in the object box representing the object. The processor of the object recognition apparatus may identify a second y-axis coordinate value (e.g., Lb1 in the third situation 521 or Lb2 in the fourth situation 531) of a point located on the left road boundary corresponding to the first x-axis coordinate value.

The processor of the object recognition apparatus may assign a first reliability value to the object based on identifying that the first y-axis coordinate value of the leftmost point is to the left of the second y-axis coordinate value.

The processor of the object recognition apparatus may identify whether an object (e.g., the first object 505, the second object 513, the third object 523, or the fourth object 533) is outside a road when the object is in a specified range. The specified range may be a range between a point having the x-axis coordinate value of a point corresponding to the host vehicle 503 (e.g., the origin point) and a point having the x-axis coordinate value of a point having the greatest absolute value of the x-axis coordinate among contour points identified as road boundaries (e.g., a1 in the first situation 501, a2 in the second situation 511, a3 in the third situation 521, or a4 in the fourth situation 531).

For example, in the first situation 501 and the second situation 511, the processor of the object recognition apparatus may identify whether an object is outside a road based on identifying that the x-axis coordinate value of the object (the first object 505 or the second object 513) is included between the x-axis coordinate value of the point corresponding to the host vehicle 503 (e.g., the origin point) and the x-axis coordinate value of a point having the greatest absolute value of the x-axis coordinate among the contour points identified as the right road boundary (e.g., a1 in the first situation 501 or a2 in the second situation 511).

For example, in the third situation 521 and the fourth situation 531, the processor of the object recognition apparatus may identify whether an object is outside a road based on identifying that the x-axis coordinate value of the object (the third object 523 or the fourth object 533) is included between the x-axis coordinate value of the point corresponding to the host vehicle 503 (e.g., the origin point) and the x-axis coordinate value of a point having the greatest absolute value of the x-axis coordinate among the contour points identified as the left road boundary (e.g., a3 in third situation 521 or a4 in fourth situation 531).

FIG. 6 shows an example of an object located inside a road in an object recognition apparatus or an object recognition method.

Referring to FIG. 6, in a first situation 601, the processor of the object recognition apparatus may identify that a first object 605 is located inside a road based on identifying the first object 605 located on the right side of a left road boundary and located on the left side of a right road boundary. In the first situation 601, the degrees of curvature of the left road boundary and the right road boundary may be less than a reference curvature.

In a second situation 611, the processor of the object recognition apparatus may identify that a second object 613 or a third object 615 is located inside a road based on identifying the second object 613 or the third object 615 located on the right side of a left road boundary and located on the left side of a right road boundary. In the second situation 611, the degrees of curvature of the left road boundary and the right road boundary may be greater than or equal to the reference curvature.

In a third situation 621, the processor of the object recognition apparatus may identify that a fourth object 623 or a fifth object 625 is located inside a road based on identifying the fourth object 623 or the fifth object 625 located on the right side of a left road boundary and located on the left side of a right road boundary. In the third situation 621, the degree of curvature of the left road boundary may be less than the reference curvature and the degree of curvature of the right road boundary may be greater than or equal to the reference curvature.

In the first situation 601, the processor of the object recognition apparatus may identify a third x-axis coordinate value that is the x-axis coordinate value (e.g., x1 in the first situation 601) of the center point of the line segment that is the lowest in the direction of movement of the first object 605 (e.g., closest to the host vehicle) among the line segments constituting the object box representing the first object 605 and a fifth y-axis coordinate value that is the y-axis coordinate value (e.g., y1 in the first situation 601) of the center point.

The processor of the object recognition apparatus may identify a sixth y-axis coordinate value (e.g., Lb1 of the first situation 601) of a point located on the left road boundary corresponding to the third x-axis coordinate value (e.g., x1 of the first situation 601) and a seventh y-axis coordinate value (e.g., Rb1 of the first situation 601) of a point located on the right road boundary corresponding to the third x-axis coordinate value. The processor of the object recognition apparatus may assign a first reliability value to an object based on identifying that the fifth y-axis coordinate value is to the right of the sixth y-axis coordinate value, and the fifth y-axis coordinate value is to the left of the seventh y-axis coordinate value.

The processor of the object recognition apparatus may identify whether the object is inside the road only when the object is included in a specified range. The specified range may be a range between points having the greater value among the fourth x-axis coordinate value (e.g., a1 in the first situation 601, a3 in the second situation 611, a5 in the third situation 621) of a point with the greatest absolute value of the x-axis coordinate among contour points identified as the left road boundary, or the fifth x-axis coordinate value (e.g., a1 in the first situation 601, a3 in the second situation 611, a4 in the third situation 621) of a point with the greatest absolute value of the x-axis coordinate among contour points identified as the right road boundary.

For example, in the first situation 601, the processor of the object recognition apparatus may identify a point (e.g., a1 in the first situation 601) having the greater value among the fourth x-axis coordinate value of a point with the greatest absolute value of the x-axis coordinate among contour points identified as the left road boundary, or the fifth x-axis coordinate value of a point with the greatest absolute value of the x-axis coordinate among contour points identified as the right road boundary.

The processor of the object recognition apparatus may identify whether an object is located inside a road based on identifying that the x-axis coordinate value of the first object 605 is included between the x-axis coordinate value of the point corresponding to a host vehicle 603 and a point having a greater value.

In the second situation 611 or the third situation 621, the processor of the object recognition apparatus may divide a specified range for identifying whether an object is located inside a road into a first range, a second range, and a third range for identification.

The x-axis coordinate values of points included in the first range may be included between the x-axis coordinate value of the point (e.g., origin) corresponding to the host vehicle 603 and the x-axis coordinate value of a point (e.g., a point corresponding to a2 in the second situation 611 or a point corresponding to a4 in the third situation 621) having a smaller value among the fourth x-axis coordinate value and the fifth x-axis coordinate value.

The x-axis coordinate values of points included in the second range may be included between the x-axis coordinate value of the point (e.g., origin) corresponding to the host vehicle 603 and the x-axis coordinate value of points (e.g., a point corresponding to a3 in the second situation 611 or a point corresponding to a5 in the third situation 621) having a greater value among the fourth x-axis coordinate value and the fifth x-axis coordinate value.

The third range may mean a range other than the first range and the second range.

The processor of the object recognition apparatus may assign a first value (e.g., 1) as a second reliability of an object (e.g., the second object 613 or the fourth object 623) included in the first range and included on the inside of a road. The processor of the object recognition apparatus may assign a second value (e.g., 0.8) less than the first value as a reliability of an object (e.g., the third object 615 or the fifth object 625) included in the second range and included on the inside of a road. This is because the boundary of the road on one side may not be identified. The processor of the object recognition apparatus may not identify whether an object included in the third range is included on the inside of a road. This is because the ranges of the boundaries of the road on both sides are not identified.

Figure 7:
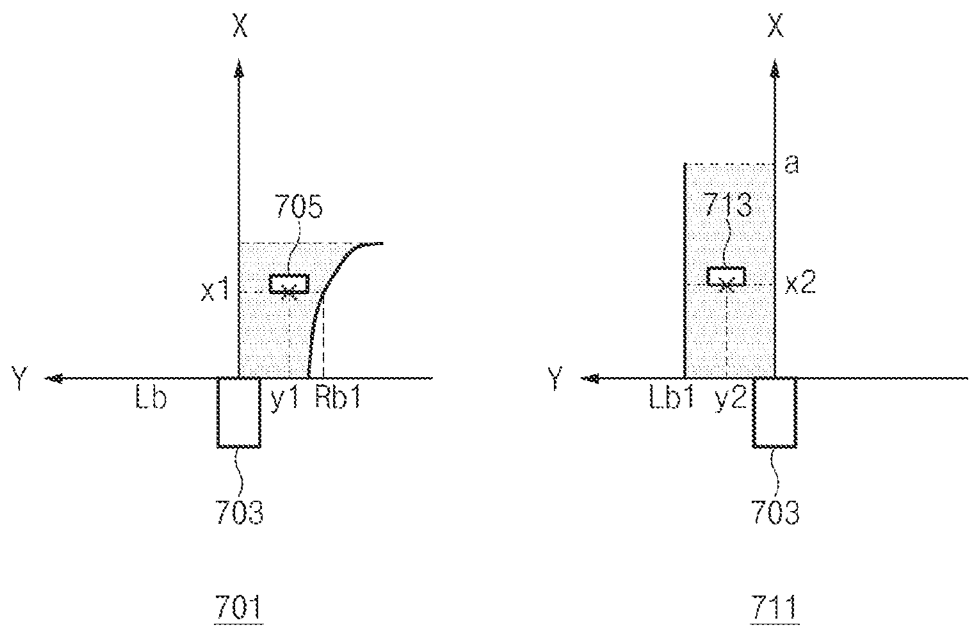
FIG. 7 shows an example of an object located on the inside of a road when one road boundary is only identified in an object recognition apparatus or an object recognition method.

FIG. 7 shows an example of an object located on the inside of a road when one road boundary is only identified in an object recognition apparatus or an object recognition method.

Referring to FIG. 7, in a first situation 701, a left road boundary cannot be identified, and only a right road boundary can be identified.

In the first situation 701, the processor of the object recognition apparatus may identify a third x-axis coordinate value that is the x-axis coordinate value (e.g., x1 in the first situation 701) of the center point of the line segment that is the lowest in the direction of movement of a first object 705 (e.g., closest to the host vehicle) among the line segments constituting the object box representing the first object 705 and a fifth y-axis coordinate value that is the y-axis coordinate value (e.g., y1 in the first situation 701) of the center point. The processor of the object recognition apparatus may identify a seventh y-axis coordinate value (Rb1 in the first situation 701) of the right road boundary corresponding to the third x-axis coordinate value.

In a second situation 711, the processor of the object recognition apparatus may identify a third x-axis coordinate value that is the x-axis coordinate value (e.g., x2 in the first situation 711) of the center point of the line segment that is the lowest in the direction of movement of a second object 713 (e.g., closest to the host vehicle) among the line segments constituting the object box representing the second object 713 and a fifth y-axis coordinate value that is the y-axis coordinate value (e.g., y2 in the second situation 711) of the center point. The processor of the object recognition apparatus may identify a seventh y-axis coordinate value (Lb1 in the second situation 711) of the left road boundary corresponding to the third x-axis coordinate value.

In the first situation 701, the processor of the object recognition apparatus may assign a second reliability value to the first object 705 based on identifying that the fifth y-axis coordinate value is identified between the y-axis coordinate value corresponding to a point corresponding to a host vehicle 703 and the seventh y-axis coordinate value.

In other words, the processor of the object recognition apparatus may assign a second reliability value based on the center point being identified as being to the right of the point corresponding to the host vehicle 703 and to the left of a point located on the right road boundary. The reason for this is that, when the first object 705 identified on the right side of the host vehicle 703 is identified as being to the left of the right road boundary, the first object 705 may be identified as being located on the inside of the road, because the host vehicle 703 is considered to be on the road.

In the second situation 711, the processor of the object recognition apparatus may assign a second reliability value to the second object 713 based on identifying that the fifth y-axis coordinate value is identified between the y-axis coordinate value corresponding to a point corresponding to the host vehicle 703 and the seventh y-axis coordinate value.

In other words, the processor of the object recognition apparatus may assign a second reliability value based on the center point being identified as being to the right of a point located on the left road boundary and to the left of the point corresponding to the host vehicle 703. The reason for this is that, when the second object 713 identified on the left side of the host vehicle 703 is identified as being to the right of the left road boundary, the second object 713 may be identified as being located on the inside of the road, because the host vehicle 703 is considered to be on the road.

A second reliability value which the processor of the object recognition apparatus has assigned to an object (e.g., the first object 705, or the second object 713) when only a right road boundary is identified, or when only a left road boundary is identified may be smaller than a second reliability value assigned to the object when both the left road boundary and the right road boundary are identified.

For example, the processor of the object recognition apparatus may assign a first value (e.g., 1) as the second reliability value of the object included on the inside of the road when both the left road boundary and the right road boundary are identified.

For example, the processor of the object recognition apparatus may assign a second value (e.g., 0.5) smaller than the first value as a reliability of the first object 705 based on only the right road boundary being identified, and the first object 705 on the right side of the host vehicle 703 being located to the left of the right road boundary as in the first situation 701.

For example, the processor of the object recognition apparatus may assign a second value (e.g., 0.5) smaller than the first value as a reliability of the second object 713 based on only the left road boundary being identified, and the second object 713 on the left side of the host vehicle 703 being located to the right of the left road boundary as in the second situation 711.

In the first situation 701, the processor of the object recognition apparatus may not assign a first reliability value or a second reliability value for the object identified on the left side with respect to the host vehicle 703. This is because the host vehicle 703 is considered to be on a road, but the location of the road boundary on the left side is not identified, so the object may not be identified as being within the road.

In the second situation 711, the processor of the object recognition apparatus may not assign the first reliability value or the second reliability value to an object identified on the right side of the host vehicle 703. This is because an object may not be identified as being on the inside of the road because the host vehicle 703 is considered to be on a road, but the location of the right road boundary is not identified.

Figure 8:
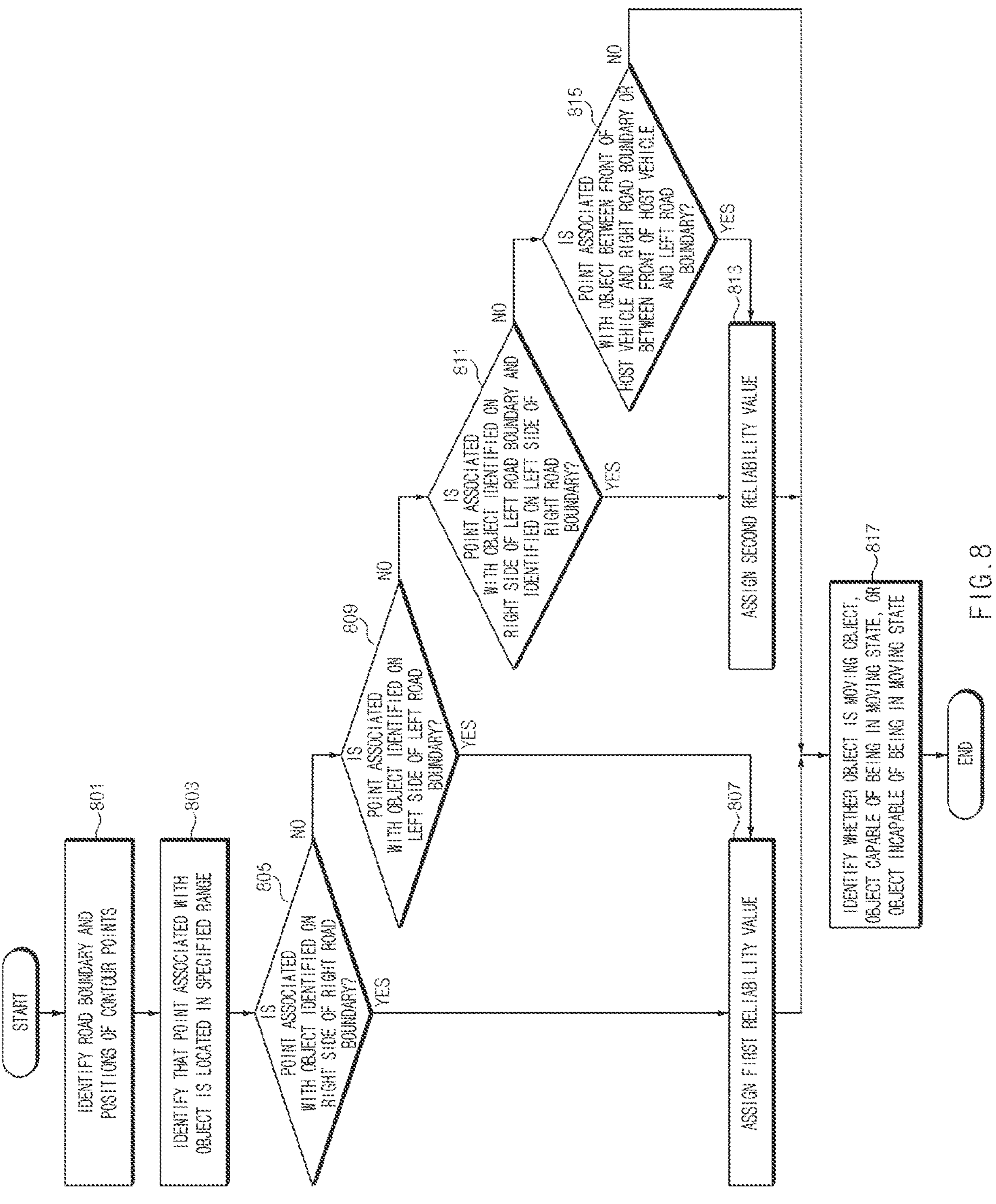
FIG. 8 shows a flowchart of operation of an object recognition apparatus, which assigns a reliability value according to a road boundary and the location of a point related to an object and classifies the object according to the reliability value in an object recognition apparatus or an object recognition method.

FIG. 8 shows a flowchart of operation of an object recognition apparatus, which assigns a reliability value according to a road boundary and the location of a point associated with an object and classifies the object according to the reliability value in an object recognition apparatus or an object recognition method.

Hereinafter, it is assumed that the object recognition apparatus 101 of FIG. 1 performs the process of FIG. 8. Additionally, in the description of FIG. 8, operations described as being performed by the apparatus may be understood as being controlled by the processor 105 of the object recognition apparatus 101.

Referring to FIG. 8, in a first operation 801, the processor of the object recognition apparatus may identify a road boundary and the positions of contour points. The processor of the object recognition apparatus may identify the road boundary on the left, the road boundary on the right, and the positions of the contour points.

In a second operation 803, the processor of the object recognition apparatus may identify that a point associated with an object is located within a specified range. The x-axis coordinate values of points included in the specified range may be included between the x-axis coordinate value of a point with the x-axis coordinate value of the point corresponding to a host vehicle and the x-axis coordinate value of a point with the greatest absolute value of the x-axis coordinate among contour points identified as road boundaries. This is because it is possible to identify whether an object is outside the road or inside the road by comparing the positions of the contour points and the road boundary only when the road boundary corresponding to the positions of the contour points are identified.

In a third operation 805, the processor of the object recognition apparatus may determine whether a point associated with the object is identified on the right side of the right road boundary. When the point associated with the object is identified on the right side of the right road boundary, the processor of the object recognition apparatus may perform a fourth operation 807. When the point associated with the object is not identified on the right side of the right road boundary, the processor of the object recognition apparatus may perform a fifth operation 809.

The processor of the object recognition apparatus may identify whether the object is outside the right side of the road. The point associated with the object may include the rightmost point among the contour points included in the object box.

In a fifth operation 809, the processor of the object recognition apparatus may determine whether a point associated with the object is identified on the left side of the left road boundary. When the point associated with the object is identified on the left side of the left road boundary, the processor of the object recognition apparatus may perform the fourth operation 807. When the point associated with the object is not identified on the left side of the left road boundary, the processor of the object recognition apparatus may perform a sixth operation 811.

The processor of the object recognition apparatus may identify whether the object is outside the left side of the road. The point related to the object may include the leftmost point among the contour points included in the object box.

In the fourth operation 807, the processor of the object recognition apparatus may assign a first reliability value to the object. The processor of the object recognition apparatus may calculate a score value indicating a probability that an object is an object incapable of being in a moving state based on the first reliability value, which is a reliability value according to the out-lane information of the object. The processor of the object recognition apparatus may store out-lane information that includes information indicating that the object is identified on the outside of the road.

The processor of the object recognition apparatus may specify in-road and out-road information (e.g., InOutRoadInfo) as a specified first code (e.g., 1) based on the object being identified outside the right road boundary. The processor of the object recognition apparatus may specify in-road and out-road information as a specified second code (e.g., 2) based on the object being identified outside the left road boundary.

In a sixth operation 811, the processor of the object recognition apparatus may determine whether a point associated with the object is identified on the right side of the left road boundary, and a point associated with the object is identified on the left side of the right road boundary. When the point associated with the object is identified on the right side of the left road boundary and the point associated with the object is identified on the left side of the right road boundary, the processor of the object recognition apparatus may perform a seventh operation 813. When the point associated with the object is not identified on the right side of the left road boundary or the point associated with the object is not identified on the left side of the right road boundary, the processor of the object recognition apparatus may perform an eighth operation 815.

The processor of the object recognition apparatus may identify whether the object is inside the right side of the road. The point corresponding to the object may include a center point of the rearmost line segment in the moving direction of the object among line segments constituting an object box including contour points representing the object. The center point may be referred to as a tracking point, but may not be limited thereto.

In the eighth operation 815, the processor of the object recognition apparatus may determine whether the point associated with the object is between the front of the host vehicle and the right road boundary, or between the front of the host vehicle and the left road boundary on the left. When the point associated with the object is between the front of the host vehicle and the right road boundary or between the front of the host vehicle and the left road boundary, the processor of the object recognition apparatus may perform the seventh operation 813. When the point associated with the object is not between the front of the host vehicle and the right road boundary or between the front of the host vehicle and the left road boundary, the processor of the object recognition apparatus may perform a ninth operation 817.

The processor of the object recognition apparatus may identify whether the object is inside the left side of the road. The point corresponding to the object may include a center point of the rearmost line segment in the moving direction of the object among line segments constituting an object box including contour points representing the object.

In the seventh operation 813, the processor of the object recognition apparatus may assign a second reliability value to the object. The processor of the object recognition apparatus may calculate a score value indicating a probability that an object is a moving object or an object capable of being in a moving state based on the second reliability value, which is a reliability value according to the in-lane information of the object. The processor of the object recognition apparatus may store the in-lane information that includes information indicating that an object is identified on the inside of the road. The processor of the object recognition apparatus may specify the in-road and out-road information (e.g., InOutRoadInfo) as a specified third code (e.g., 3) based on the object being identified inside the road boundary and the x-axis coordinate value of the object being included in a specified first range. The processor of the object recognition apparatus may specify the in-road and out-road information as a specified fourth code (e.g., 4) based on the object being identified outside the left road boundary. The processor of the object recognition apparatus may specify the in-road and out-road information as a fifth code (e.g., 0) based on the in-road and out-road information (e.g., InOutRoadInfo) not being identified as the first code to the fourth code.

In the ninth operation 817, the processor of the object recognition apparatus may identify whether the object is a moving object, an object capable of being in a moving state, or an object incapable of being in a moving state.

The processor of the object recognition apparatus may calculate a score value indicating a probability that an object is an object incapable of being in a moving state based on the first reliability value, which is a reliability value according to the out-lane information of the object. The processor of the object recognition apparatus may calculate a score value indicating a probability that an object is a moving object or an object capable of being in a moving state based on the second reliability value, which is a reliability value according to the in-lane information of the object.

The processor of the object recognition apparatus may identify that an object is a moving object or an object that is able to be in a moving state, based on the score value indicating the probability that an object is a moving object or an object that is able to be in a moving state being greater than the score value indicating the probability that an object is an object that is unable to be in a moving state.

Figure 9:
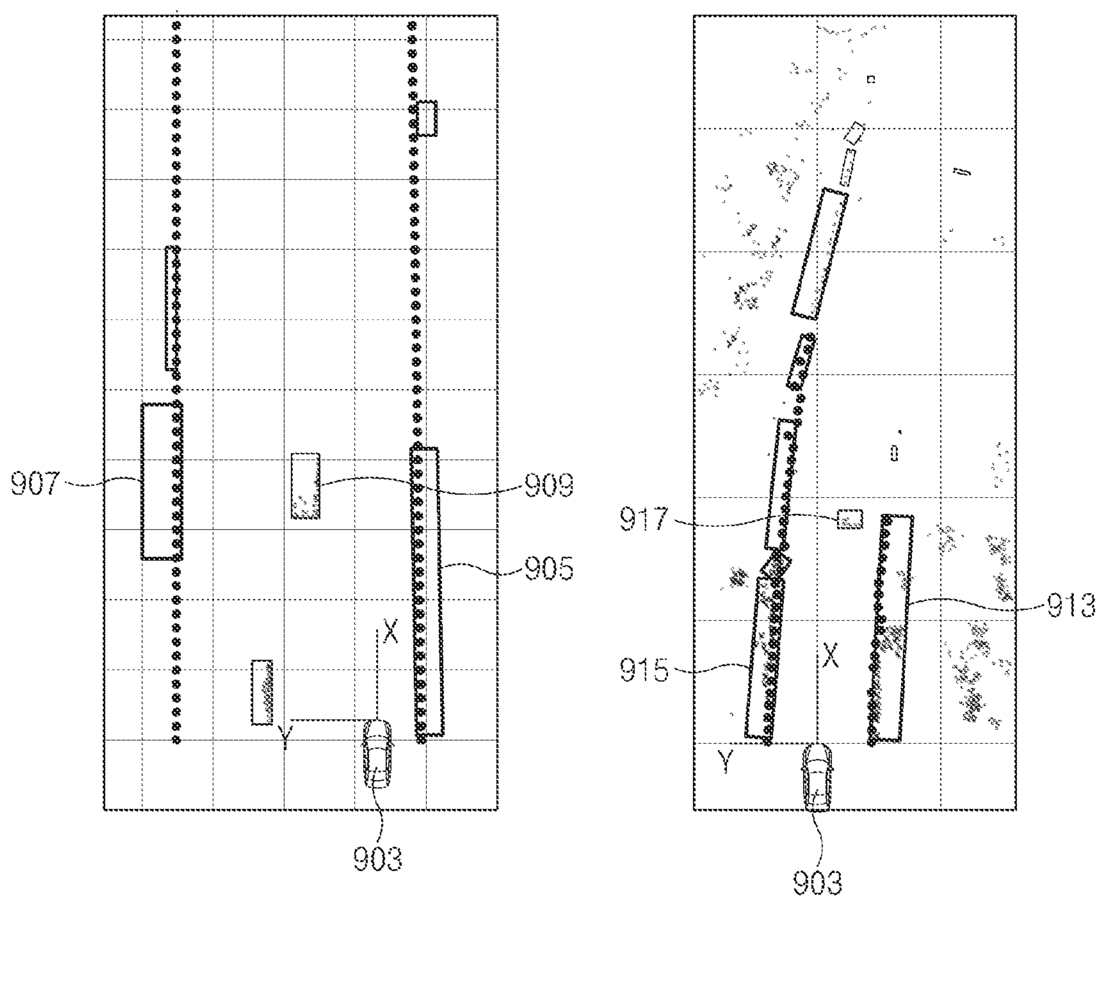
FIG. 9 shows an example of classification according to the location of an object when both a left road boundary and a right road boundary are identified in an object recognition apparatus or an object recognition method.

FIG. 9 shows an example of classification according to the location of an object when both a left road boundary and a right road boundary are identified in an object recognition apparatus or an object recognition method.

Referring to FIG. 9, in a first situation 901, the processor of the object recognition apparatus may identify a first object 905 and a second object 907 on the outside of a road and a third object 909 on the inside of the road. The object recognition apparatus may be included in a host vehicle 903. In a second situation 911, the processor of the object recognition apparatus may identify a fourth object 913 and a fifth object 915 on the outside of a road, and a sixth object 917 on the inside of a road. The object recognition apparatus may be included in the host vehicle 903.

In the first situation 901 and the second situation 911, the processor of the object recognition apparatus may assign a first reliability value to an object identified on the outside of the road (e.g., the first object 905, the second object 907, the fourth object 913 or the fifth object 915). The first reliability value may be assigned to an object to identify whether the object is a moving object or an object capable of being in a moving state. For example, the processor of the object recognition apparatus may assign a first reliability value of 1 to an object located outside a road.

In the first situation 901 and the second situation 911, the processor of the object recognition apparatus may assign a second reliability value to an object identified inside a road (e.g., the third object 909 or the sixth object 917). The second reliability value may be assigned to an object to identify whether the object is an object incapable of being in a moving state. For example, the processor of the object recognition apparatus may assign a second reliability value of 1 to an object inside the road.

Figure 10:
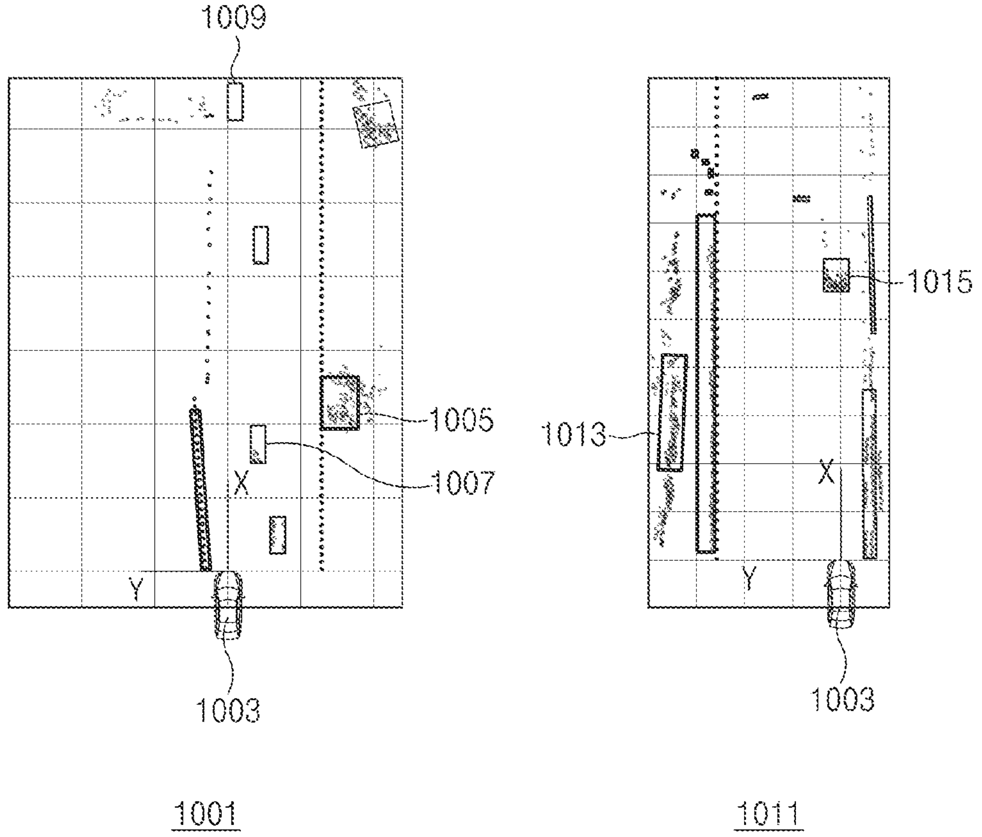
FIG. 10 shows an example of classification according to the location of an object when only one road boundary is identified in an object recognition apparatus or an object recognition method.

FIG. 10 shows an example of classification according to the location of an object when only one road boundary is identified in an object recognition apparatus or an object recognition method.

Referring to FIG. 10, in a first situation 1001, the processor of the object recognition apparatus may identify a first object 1005 on the outside of a road, a second object 1007 on the inside of the road included in a specified first range, and a third object 1009 on the inside of the road included in a specified second range. The object recognition apparatus may be included in a host vehicle 1003.

In a second situation 1011, when only a road boundary on the left is identified, the processor of the object recognition apparatus may identify a fourth object 1013 in the outside of the road and a fifth object 1015 in the inside of the road. The object recognition apparatus may be included in the host vehicle 1003.

In the first situation 1001, the processor of the object recognition apparatus may assign a first reliability value to the first object 1005 as a first value (e.g., 1). The processor of the object recognition apparatus may assign a second reliability value to the second object 1007 as a first value (e.g., 1). The processor of the object recognition apparatus may assign a second value (e.g., 0.8) that is smaller than the first value to the third object 1009 as a second reliability value.

In the second situation 1011, the processor of the object recognition apparatus may assign a first value (e.g., 1) to the fourth object 1013 as a first reliability value. The processor of the object recognition apparatus may assign a third value (e.g., 0.5) smaller than the first value and the second value to the fifth object 1015 as a second reliability value. This is because only the road boundary on the left is identified, and the x-axis coordinate of the fifth object 1015 is identified as being between the x-axis coordinate of the host vehicle 1003 and the x-axis coordinate of the road boundary on the left.

Figure 11:
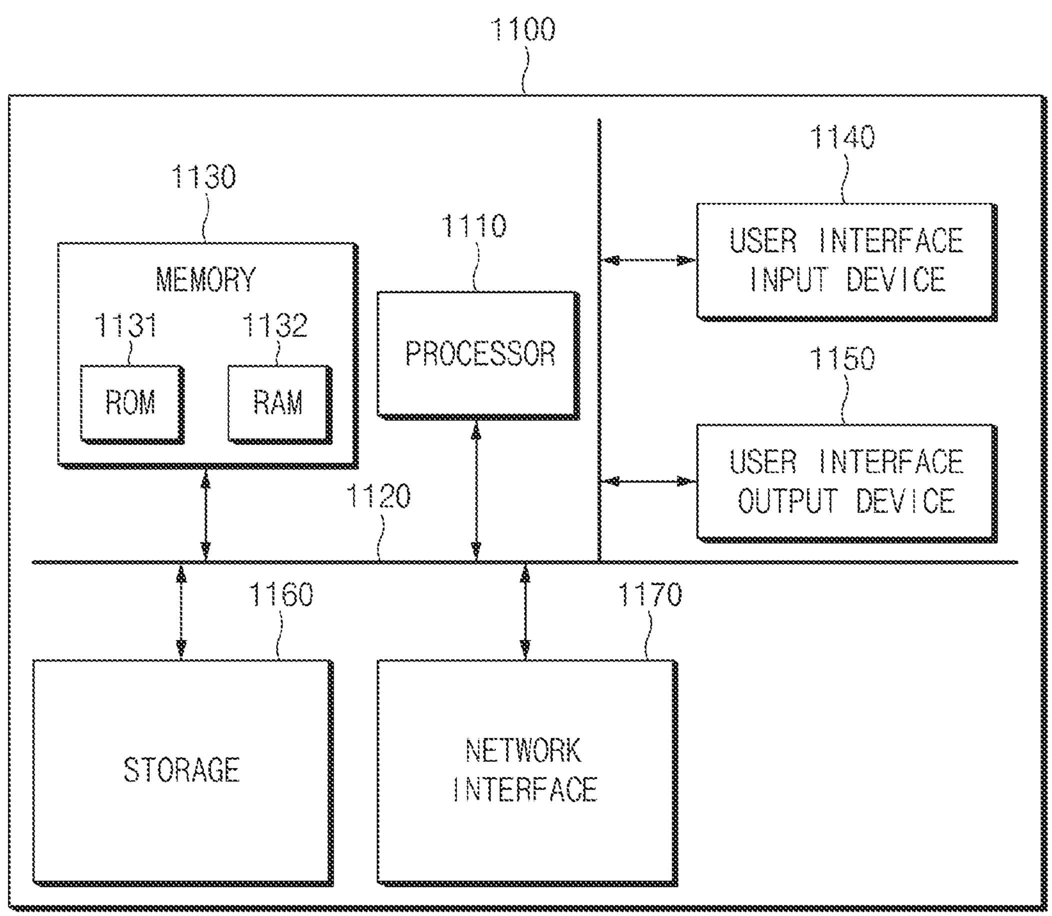
FIG. 11 illustrates a computing system related to an object recognition apparatus and an object recognition method.

FIG. 11 illustrates a computing system for an object recognition apparatus and an object recognition method.

Referring to FIG. 11, a computing system 1100 may include at least one processor 1110, a memory 1130, a user interface input device 1140, a user interface output device 1150, storage 1160, and a network interface 1170, which are connected with each other via a bus 1120.

The processor 1110 may be a central processing unit (CPU) or a semiconductor device that processes instructions stored in the memory 1130 and/or the storage 1160. The memory 1130 and the storage 1160 may include various types of volatile or non-volatile storage media. For example, the memory 1130 may include a ROM (Read Only Memory) 1131 and a RAM (Random Access Memory) 1132.

Thus, the operations of the method or the algorithm described in connection with one or more example embodiments disclosed herein may be embodied directly in hardware or a software module executed by the processor 1110, or in a combination thereof. The software module may reside on a storage medium (that is, the memory 1130 and/or the storage 1160) such as a RAM, a flash memory, a ROM, an EPROM, an EEPROM, a register, a hard disk, a removable disk, and a CD-ROM.

The exemplary storage medium may be coupled to the processor 1110, and the processor 1110 may read information out of the storage medium and may record information in the storage medium. Alternatively, the storage medium may be integrated with the processor 1110. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Accordingly, one or more example embodiments disclosed in the present disclosure are not intended to limit the technical idea of the present disclosure but to describe the present disclosure, and the scope of the technical idea of the present disclosure is not limited by the example embodiments. The scope of protection of the present disclosure should be interpreted by the following claims, and all technical ideas within the scope equivalent thereto should be construed as being included in the scope of the present disclosure.

The present technology may increase the accuracy of determination of identifying whether an object is a moving object or an object capable of being in a moving state by using road boundaries and the positions of contour points representing an object.

Further, the present technology may identify whether a partially occluded object is an object in a moving state or an object that can be in a moving state by using road boundaries and the positions of contour points representing the object.

Further, the present technology may identify whether an object being in a stationary state is a moving object or an object capable of being in a moving state by using road boundaries and the positions of contour points representing the object.

Further, the present technology may identify whether an object, which is not located on a lane where another object which is a moving object or an object capable of being in a moving state, is a moving object or an object capable of being in a moving state by using road boundaries and the positions of contour points representing the object.

Further, the present technology may enhance user experience by improving the accuracy of determination of identifying whether an object is a moving object or an object capable of being in a moving state.

Further, the present technology may improve the performance of autonomous driving or driver assistance driving by improving the accuracy of determination of identifying whether an object is a moving object or an object capable of being in a moving state.

In addition, various effects may be provided that are directly or indirectly understood through the disclosure.

Hereinabove, although the present disclosure has been described with reference to one or more example embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An object recognition apparatus comprising:

a sensor; and a processor configured to:

determine, based on at least one frame of data obtained via the sensor, at least one of a left road boundary or a right road boundary, of a road on which a vehicle is located;

determine, on a plane formed based on at least two coordinate axes in a specific frame of the data, positions of contour points that represent an object;

assign a first reliability value or a second reliability value to the object based on at least one of the left road boundary, the right road boundary, or the positions of the contour points; and determine, based on the first reliability value or the second reliability value, whether the object is a moving object, a movable stationary object, or an immovable stationary object, wherein the first reliability value indicates that the object is the immovable stationary object, wherein the second reliability value indicates that the object is the moving object or the movable stationary object, and wherein the second reliability value assigned to the object is less when only one of the left road boundary or the right road boundary is determined than when both the left road boundary and the right road boundary are determined.

2. The object recognition apparatus of claim 1, wherein the processor is configured to assign the first reliability value or the second reliability value to the object by:

determining, based on the contour points and based on the positions of the contour points being on a right side of the vehicle, a first object box;

determining a first y-axis coordinate value and a first x-axis coordinate value of a rightmost point of the contour points included in the first object box;

determining a second y-axis coordinate value of a first point that is located on the right road boundary and corresponds to the first x-axis coordinate value;

assigning the first reliability value to the object, based on the first y-axis coordinate value and the second y-axis coordinate value indicating that the rightmost point is to right of the first point;

determining, based on second contour points and based on positions of the second contour points being on a left side of the vehicle, a second object box;

determining a third y-axis coordinate value and a second x-axis coordinate value of a leftmost point of the second contour points included in the second object box;

determining a fourth y-axis coordinate value of a second point that is located on the left road boundary and corresponds to the second x-axis coordinate value; and assigning the first reliability value to the object based on the third y-axis coordinate value and the fourth y-axis coordinate value indicating that the leftmost point is to left of the second point.

3. The object recognition apparatus of claim 1, wherein the processor is configured to assign the first reliability value or the second reliability value to the object by:

determining an object box comprising the contour points;

determining a first y-axis coordinate value and a first x-axis coordinate value of a center point of a line segment, closest to the vehicle, of the object box; and assigning the second reliability value to the object based on:

the first x-axis coordinate value being located within a specified range, the first y-axis coordinate value being to right of a second y-axis coordinate value of a point that is located on the left road boundary and corresponds to the first x-axis coordinate value, and the first y-axis coordinate value being to left of a third y-axis coordinate value of a point that is located on the right road boundary and corresponds to the first x-axis coordinate value.

4. The object recognition apparatus of claim 1, wherein the processor is further configured to:

determine, as a reference value, a greater of:

a first x-axis coordinate value of a first point having a greatest absolute x-axis coordinate value of the left road boundary, and a second x-axis coordinate value of a second point having a greatest absolute x-axis coordinate value of the right road boundary; and determine whether the object is located in a specified range, wherein the specified range comprises points having an x-axis coordinate value between a third x-axis coordinate value of a third point corresponding to the vehicle and the reference value.

5. The object recognition apparatus of claim 1, wherein the processor is configured to assign the first reliability value or the second reliability value to the object by:

determining, as a first reference value, a lesser of:

a first x-axis coordinate value of a first point having a greatest absolute x-axis coordinate value of the left road boundary, and a second x-axis coordinate value of a second point having a greatest absolute x-axis coordinate value of the right road boundary;

determining, as a second reference value, a greater of the first x-axis coordinate value and the second x-axis coordinate value;

assigning a first value to the object as the second reliability value, based on a determination that a third x-axis coordinate value of a third point corresponding to the object is between:

a fourth x-axis coordinate value of a fourth point corresponding to the vehicle, and the first reference value;

determining, as a third reference value, a lesser of:

a fifth x-axis coordinate value of a fifth point having a greatest absolute x-axis coordinate value of a second left road boundary, and a sixth x-axis coordinate value of a sixth point having a greatest absolute x-axis coordinate value of a second right road boundary;

determining, as a fourth reference value, a greater of the fifth x-axis coordinate value and the sixth x-axis coordinate value; and assigning a second value less than the first value to the object as the second reliability value, based on a determination that a seventh x-axis coordinate value of a seventh point corresponding to a second object is between the third reference value and the fourth reference value.

6. The object recognition apparatus of claim 1, wherein the processor is configured to assign the first reliability value or the second reliability value to the object by performing one of:

assigning, based on the left road boundary being determined and the right road boundary being not determined, the second reliability value to the object, based on a determination that a center point of a closest line segment, to the vehicle, of an object box, which comprises the contour points, is:

to left of a first point corresponding to the vehicle, and to right of a second point located on the left road boundary, according to:

a first y-axis coordinate value of a third point that is located on the left road boundary and corresponds to a first x-axis coordinate value of the center point, and a second y-axis coordinate value of the center point; or assigning, based on the right road boundary being determined and the left road boundary being not determined, the second reliability value to the object, based on a determination that the center point is:

to right of a fourth point corresponding to the vehicle, and to left of a fifth point located on the right road boundary, according to:

a third y-axis coordinate value of a sixth point that is located on the right road boundary and corresponds to the first x-axis coordinate value, and the second y-axis coordinate value.

7. The object recognition apparatus of claim 1, wherein the processor is configured to assign the first reliability value or the second reliability value to the object by:

determining whether the second reliability value is assigned to a second object to which the first reliability value has not been assigned.

8. The object recognition apparatus of claim 1, wherein the processor is configured not to assign the first reliability value or the second reliability value to:

a second object on a right side of the vehicle based on the right road boundary being not determined and the left road boundary being determined, and a third object on a left side of the vehicle based on the left road boundary being not determined and the right road boundary being determined.

9. The object recognition apparatus of claim 1, wherein the moving object or the movable stationary object comprises a vehicle different from the vehicle, and wherein the processor is configured to assign, to the object, an identifier indicating that the object is the moving object or the movable stationary object.

10. The object recognition apparatus of claim 1, wherein the processor is further configured to:

control an autonomous driving operation of the vehicle based on the determination of whether the object is the moving object, the movable stationary object, or the immovable stationary object.

11. An object recognition method performed by a computing device, the method comprising:

identifying determining, based on at least one frame of data obtained via a sensor, at least one of a left road boundary or a right road boundary, of a road on which vehicle is located;

determining, on a plane formed based on at least two coordinate axes in a specific frame of the data, positions of contour points that represent an object;

assigning a first reliability value or a second reliability value to the object based on at least one of the left road boundary, the right road boundary, or the positions of the contour points;

determining, based on the first reliability value or the second reliability value, whether the object is a moving object, a movable stationary object, or an immovable stationary object; and not assigning the first reliability value or the second reliability value to:

a second object on a right side of the vehicle based on the right road boundary being not determined and the left road boundary being determined, and a third object on a left side of the vehicle based on the left road boundary being not determined and the right road boundary being determined, wherein the first reliability value indicates that the object is the immovable stationary object, and wherein the second reliability value indicates that the object is the moving object or the movable stationary object.

12. The object recognition method of claim 11, wherein the assigning of the first reliability value or the second reliability value to the object comprises:

determining, based on the contour points and based on the positions of the contour points being on a right side of the vehicle, a first object box;

determining a first y-axis coordinate value and a first x-axis coordinate value of a rightmost point of the contour points included in the first object box;

determining a second y-axis coordinate value of a first point that is located on the right road boundary and corresponds to the first x-axis coordinate value;

assigning the first reliability value to the object, based on the first y-axis coordinate value and the second y-axis coordinate value indicating that the rightmost point is to right of the first point;

determining, based on second contour points and based on positions of the second contour points being on a left side of the vehicle, a second object box;

determining a third y-axis coordinate value and a second x-axis coordinate value of a leftmost point of the second contour points included in the second object box;

determining a fourth y-axis coordinate value of a second point that is located on the left road boundary and corresponds to the second x-axis coordinate value; and assigning the first reliability value to the object based on the third y-axis coordinate value and the fourth y-axis coordinate value indicating that the leftmost point is to left of the second point.

13. The object recognition method of claim 11, wherein the assigning of the first reliability value or the second reliability value to the object comprises:

determining an object box comprising the contour points;

determining a first y-axis coordinate value and a first x-axis coordinate value of a center point of a line segment, closest to the vehicle, of the object box; and assigning the second reliability value to the object based on:

the first x-axis coordinate value being located within a specified range, the first y-axis coordinate value being to right of a second y-axis coordinate value of a point that is located on the left road boundary and corresponds to the first x-axis coordinate value, and the first y-axis coordinate value being to left of a third y-axis coordinate value of a point that is located on the right road boundary and corresponds to the first x-axis coordinate value.

14. The object recognition method of claim 11, further comprising:

determining, as a reference value, a greater of:

a first x-axis coordinate value of a first point having a greatest absolute x-axis coordinate value of the left road boundary, and a second x-axis coordinate value of a second point having a greatest absolute x-axis coordinate value of the right road boundary; and determining whether the object is located in a specified range, wherein the specified range comprises points having an x-axis coordinate value between a third x-axis coordinate value of a third point corresponding to the vehicle and the reference value.

15. The object recognition method of claim 11, wherein the assigning of the first reliability value or the second reliability value to the object comprises:

determining, as a first reference value, a lesser of:

a first x-axis coordinate value of a first point having a greatest absolute x-axis coordinate value of the left road boundary and a second x-axis coordinate value of a second point having a greatest absolute x-axis coordinate value of the right road boundary;

determining, as a second reference value, a greater of the first x-axis coordinate value and the second x-axis coordinate value;

assigning a first value to the object as the second reliability value based on a determination that a third x-axis coordinate value of a third point corresponding to the object is between:

a fourth x-axis coordinate value of a fourth point corresponding to the vehicle, and the first reference value;

determining, as a third reference value, a lesser of:

a fifth x-axis coordinate value of a fifth point having a greatest absolute x-axis coordinate value of a second left road boundary, and a sixth x-axis coordinate value of a sixth point having a greatest absolute x-axis coordinate value of a second right road boundary;

determining, as a fourth reference value, a greater of the fifth x-axis coordinate value and the sixth x-axis coordinate value; and assigning a second value less than the first value to the object as the second reliability value, based on a determination that a seventh x-axis coordinate value of a seventh point corresponding to a fourth object is between the third reference value and the fourth reference value.

16. The object recognition method of claim 11, wherein the assigning of the first reliability value or the second reliability value to the object comprises:

Assigning, based on the left road boundary being determined and the right road boundary being not determined, the second reliability value to the object, based on a determination that a center point of a closest line segment, to the vehicle, of an object box, which comprises the contour points, is:

to left of a first point corresponding to the vehicle, and to right of a second point located on the left road boundary, according to:

a first y-axis coordinate value of a third point that is located on the left road boundary and corresponds to a first x-axis coordinate value of the center point, and a second y-axis coordinate value of the center point; or assigning, based on the right road boundary being determined and the left road boundary being not determined, the second reliability value to the object, based on a determination that the center point is:

to right of a fourth point corresponding to the vehicle, and to left of a fifth point located on the right road boundary, according to:

a third y-axis coordinate value of a sixth point that is located on the right road boundary and corresponds to the first x-axis coordinate value, and the second y-axis coordinate value.

17. The object recognition method of claim 11, wherein the second reliability value assigned to the object is less when only one of the left road boundary or the right road boundary is determined than when both the left road boundary and the right road boundary are determined.

18. The object recognition method of claim 11, wherein the assigning of the first reliability value or the second reliability value to the object comprises:

determining whether the second reliability value is assigned to a fourth object to which the first reliability value has not been assigned.

19. The object recognition method of claim 11, wherein the moving object or the movable stationary object comprises a vehicle different from the vehicle, and wherein the method further comprises:

assigning, to the object, an identifier indicating that the object is the moving object or the movable stationary object.

20. The object recognition method of claim 11, further comprising:

controlling an autonomous driving operation of the vehicle based on the determination of whether the object is the moving object, the movable stationary object, or the immovable stationary object.

* * * * *